United States Patent
Bichler et al.

(10) Patent No.: US 6,637,188 B2
(45) Date of Patent: Oct. 28, 2003

(54) ROCKET ENGINE COMBUSTION CHAMBER WITH ENHANCED HEAT TRANSFER TO COOLING JACKET

(75) Inventors: Peter Bichler, Schondorf (DE); Hans Immich, Ottobrunn (DE); Joachim Kretschmer, Feldafing (DE); Günther Schmidt, Taufkirchen (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 09/985,313

(22) Filed: Nov. 2, 2001

(65) Prior Publication Data
US 2002/0092291 A1 Jul. 18, 2002

(30) Foreign Application Priority Data
Nov. 2, 2000 (DE) .......................................... 100 54 33

(51) Int. Cl.[7] ................................................. F02K 9/42
(52) U.S. Cl. .......................... 60/257; 60/266; 239/127.1
(58) Field of Search .......................... 60/257, 259, 266, 60/267; 239/127.1, 127.3, 139

(56) References Cited
U.S. PATENT DOCUMENTS

| | | | | |
|---|---|---|---|---|
| 1,170,834 A | * | 2/1916 | Lovekin | 236/80 R |
| 3,713,293 A | * | 1/1973 | Simon | 60/267 |
| 3,832,847 A | * | 9/1974 | Butter et al. | 60/267 |
| 4,583,362 A | * | 4/1986 | Wagner | 60/259 |
| 4,781,019 A | * | 11/1988 | Wagner | 60/260 |
| 5,221,045 A | * | 6/1993 | McAninch et al. | 239/1 |
| 5,832,719 A | * | 11/1998 | Riccardi | 60/267 |
| 6,151,887 A | * | 11/2000 | Haidn et al. | 60/257 |
| 6,269,647 B1 | * | 8/2001 | Thompson, Jr. et al. | 60/478 |

FOREIGN PATENT DOCUMENTS

| | | | |
|---|---|---|---|
| DE | 1135405 | * | 8/1962 |
| DE | 19901422 | * | 7/2000 |
| WO | 01/69070 | | 9/2001 |

OTHER PUBLICATIONS

Immich, et al. "Cryogenic Liquid Rocket Engine Technology Developments within the German National Technology Programme" AIAA, 1997.

* cited by examiner

Primary Examiner—Charles G. Freay
Assistant Examiner—John F. Belena
(74) Attorney, Agent, or Firm—Crowell & Moring LLP

(57) ABSTRACT

A combustion chamber for a rocket engine expels a hot stream of gas and has a cooling device. The inner wall of the combustion chamber adjoins the cooling device and contains depressions formed in such a way that the stable outer layer of the stream of gas that forms in the proximity of the inner wall of the combustion chamber during operation of the combustion chamber is destabilized in the area of the depressions.

8 Claims, 3 Drawing Sheets

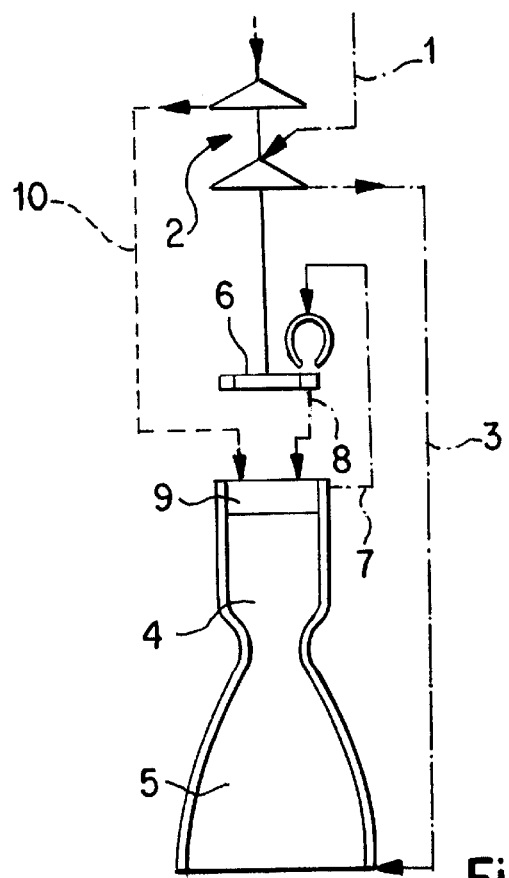
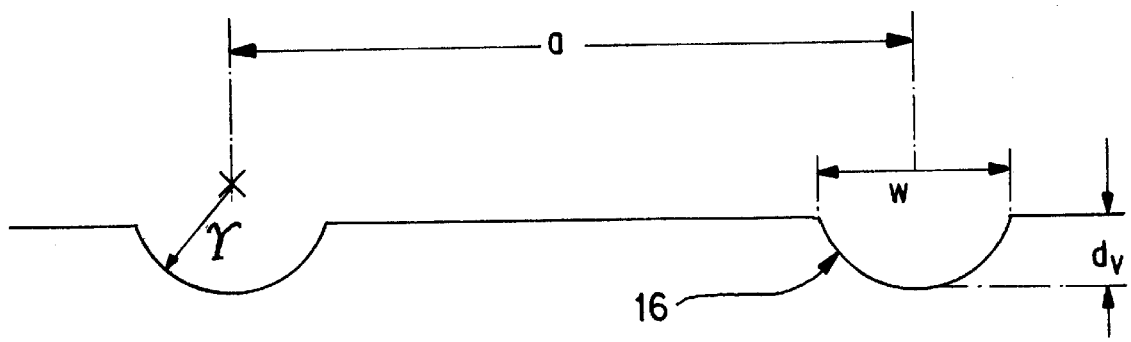
Fig. 1 PRIOR ART
Fig. 4

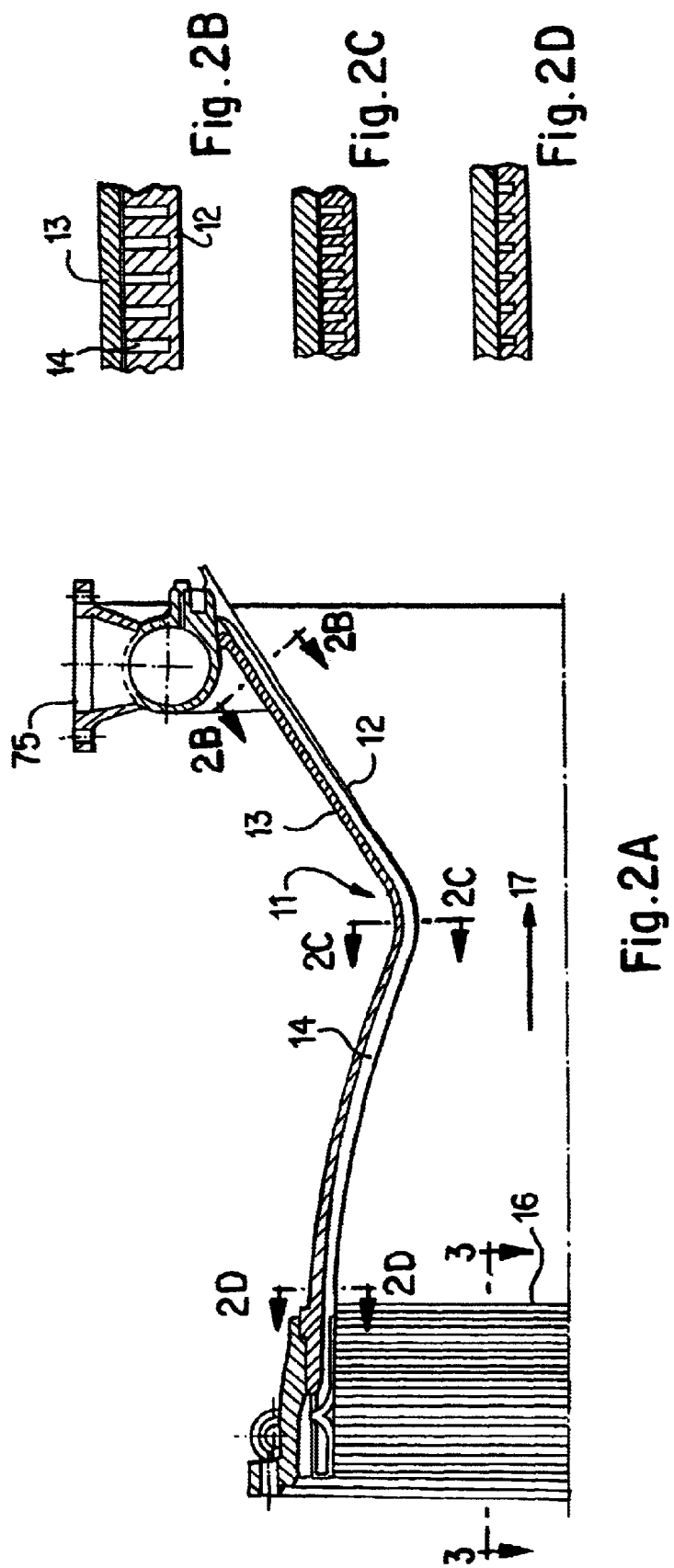

ROCKET ENGINE COMBUSTION CHAMBER WITH ENHANCED HEAT TRANSFER TO COOLING JACKET

This application claims the priority of German patent document 100 54 33.2, filed Nov. 2, 2000, the disclosure of which is expressly incorporated by reference herein.

BACKGROUND OF THE INVENTION

The present invention concerns a combustion chamber for a rocket engine that expels a stream of hot gases, in particular a cooling device and the inner wall of the combustion chamber that is adjacent to the cooling device.

A combustion-chamber cooling device located adjacent to a combustion chamber is normally intended to keep the combustion-chamber wall, which is heated by the burning gases, cool enough to ensure a satisfactory lifetime for the combustion chamber. However, in special types of rocket engines, such as regenerative cooled engines, it is desirable to achieve enhanced heat transfer to the cooling device because the heat absorbed from the rocket engines by the cooling device is used to increase the engine's operating efficiency, for example, by running fuel pumps. This means that enhanced heat transfer to the cooling device will result in more efficient engine operation.

One option for enhancing heat transfer in existing technology is described in DE 199 01 422. A disclosed combustion chamber has longitudinal ribs to accommodate a cooling channel containing a coolant. Enhanced heat transfer is achieved by enlarging the inner surface of the combustion chamber. The disadvantages of this approach are the technical difficulties of producing the longitudinal ribs, and the fact that this also increases the engine's mass. Another option for enlarging the inner surface of the combustion chamber is found in DE 1 135 405 and U.S. Pat. No. 5,221,045, where cooling pipes are formed by curving sections of the internal walls of the combustion chamber upward. This method also involves considerable technical difficulty during production, and it has the additional disadvantages of low structural stability and capacity to withstand stress.

Another conceivable alternative is to lengthen the combustion chamber in order to increase the inner surface area. As the total length of an engine is often fixed, however, this approach can lead to a shortening of the propulsion nozzle, which can result in a reduction in engine performance. Another conceivable measure might be a reduction in the temperature of the combustion-chamber wall on the hot-gas side. With the normal procedures used in cooling devices, however, it is only possible to achieve a slight increase in the difference between the gas temperature in the hot gas stream and the temperature of the combustion-chamber wall, and this would also involve a major loss of pressure in the coolant, which in regenerative cooled engines would also result in a reduction in combustion-chamber pressure.

SUMMARY OF THE INVENTION

An object of the present invention is therefore to provide a combustion chamber for a rocket engine that will enable enhanced heat intake by a cooling device in a simple way.

This object has been achieved by providing an inner combustion-chamber wall having depressions that are formed so as to result in flow destabilization of the stable outer layer of the gas stream that forms on the proximity of the inner combustion chamber wall during its operation.

This novel approach provides for a combustion chamber for a rocket engine that expels a stream of hot gases and which has a cooling device. The inner wall of the combustion chamber is the inner surface of the wall between the combustion chamber and the cooling device. In the present invention, the inner wall of the combustion chamber contains depressions. These depressions are formed in such a way that they cause hydrodynamic destabilization of the stable outer layer of the stream of gases that forms in the proximity of the depressions during operation of the combustion chamber.

The present invention therefore takes a different approach to the problem than conventional technology. It can be demonstrated that in the normal case, where there is a smooth inner combustion-chamber wall, gas flow in the combustion chamber in the proximity of the combustion-chamber wall forms a smooth outer layer that develops a certain thermal insulation effect, which works against the combustion-chamber wall absorbing heat from the stream of hot gases. The present invention is configured to systematically disturb the formation of this thermally insulating outer layer, which will considerably increase heat transfer to the combustion chamber wall. This surprising feature of the present invention has a virtually negligible effect on the characteristics of the combustion chamber as a whole because the depressions are formed so that their effect is actually limited to the outer layer.

From page 13 of H. Immich et al.: "Cryogenic Liquid Rocket Engine Technology Developments within the German National Technology Programme," AIAA 97-2822, 33$^{rd}$ AIAA/ASME/SAE/ASEE Joint Propulsion Conference & Exhibit, Jul. 6–9, 1997, Seattle, Wash., it was known that an increase in heat transfer from hot gases was possible in principle, if the form of the thermally insulating outer layer were disturbed. At that stage of technology, however, no suitable way could be cited by which to successfully achieve this effect. What is more, this document assumed that the production of this effect was technically very difficult and therefore rejected the possibility.

According to the present invention, making depressions with the appropriate form in the combustion-chamber wall has been found to be the solution to the problems cited above, and it provides a simple procedure for eliminating the disadvantages associated with existing technology, as these depressions can be made in the internal combustion chamber wall without great expense.

The depressions according to the present invention should preferably have a maximum depth that is no more than half the thickness of the inner combustion-chamber wall. The depth of the depressions can be adjusted to the expansion of the outer layer in each case. The depressions can therefore have a depth that does not exceed the thickness of the outer layer.

Different types of depressions can be made in order to achieve the desired effects. For example, depressions can be formed by roughening the surface through the use of appropriate blast media. The depressions can also take the form of grooves with a maximum slant of 45° against the circumference direction of the combustion chamber. They can also take the form of closed grooves or threading consisting of at least one spiral. Threading is a particularly easy way to make these depressions.

Unless automatically determined by the production method, the form of depressions can be optimized according to different criteria. For example, the cross-section of the depressions can take the form of a segment of a circle, in which the radius of the circle segment is greater than or equal to the depth of the depression. This can reduce the notching-effect of the depressions, which can increase the lifetime of the combustion chamber.

Variation in the density of the number of depressions, particularly in the number of depressions per unit of area in the case of a roughened surface, or the number of depressions per unit of length in the case of grooves, can localize the disturbing effect of the depressions on the outer layer, and in this way adjust local heat transfer for each area of the combustion chamber wall to different conditions and requirements.

It is also currently preferable that different areas of the inner combustion-chamber wall have different densities in the number of depressions. This applies particularly to a combustion chamber where the fuel injection head is found on one end, and on the opposite end, a combustion chamber neck as the exhaust opening for the gas stream. In these combustion chambers, there are particularly high heat-flux values in the area of the combustion-chamber neck.

In order to reduce these values, there can be a higher density in the number of depressions in the area downstream from the combustion chamber neck. In that way, a greater part of the heat can be transferred to the combustion-chamber wall before the heat reaches the nozzle neck. A combustion chamber like that described above also displays relatively low heat flux in the area of the fuel injection head, as the gas flow in this area has a lower temperature than it does further downstream.

Higher density in the number of depressions in this area of the combustion-chamber wall can increase heat transfer to the combustion-chamber wall, so that local heat transfer at this point can be aligned with local heat transfer in areas of the combustion-chamber wall located farther downstream. This makes it possible to achieve even heat transfer over the entire length of the combustion chamber. There can be alternate or cumulative increases in the density of the number of depressions in individual areas of the combustion-chamber wall.

Other objects, advantages and novel features of the present invention will become apparent from the following detailed description of the present invention when considered in conjunction with the accompanying drawings.

BRIEF DESCRIPTION OF THE DRAWINGS

FIG. 1 is a schematic view of a rocket engine with regenerative cooling based on the mainstream process without pre-burning (expander process);

FIG. 2(a) is a cross-sectional view of a combustion chamber with diagonal grooves in accordance with the present invention;

FIGS. 2(b)–(d) are isolated cross-sectional views along lines a—a, b—b, c—c, respectively of FIG. 2(a);

FIG. 4 is a representational view of the geometry of the diagonal grooves in accordance with the present invention.

DETAILED DESCRIPTION OF THE DRAWINGS

Figure 3:
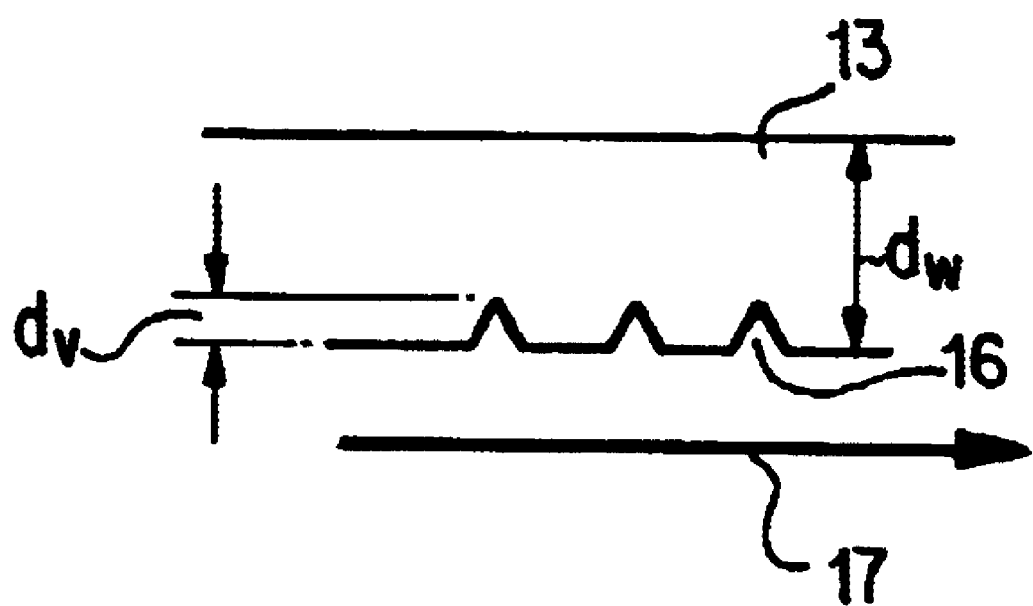
FIG. 3 is a schematic view of the relative dimensions of combustion-chamber wall thickness and groove depth to explain the principles of the present invention.

FIG. 1 depicts one embodiment of a special type of rocket engine that operates according to the mainstream process, i.e., without pre-burning, also called the expander process. The first propellant is brought via a fuel line 1 to a fuel pump 2. There, a fuel line 3 branches off, bringing the first propellant to a cooling device, which serves to cool the wall of the combustion chamber 4, and possibly also the exhaust nozzle 5 of the rocket engine. While cooling, the first propellant absorbs heat from the combustion chamber 4 and possibly also from the exhaust nozzle 5. Another fuel line 7 takes the first propellant, along with the thermal energy it contains, away from the combustion chamber 4. This thermal energy is used to run a turbine 6 that propels the fuel pump 2. Thereafter, the first propellant is brought via a fuel line 8 to the injection head 9 of the rocket engine and injected into the combustion chamber 4 for burning. The second propellant is brought directly to the injection head 9 after passing the fuel pump 2 via the fuel line 10 and also injected into the combustion chamber.

In order for the rocket engine described above to achieve the highest possible combustion-chamber pressure, which will ensure the most efficient running of the engine, it is necessary that as much heat as possible be absorbed by the first propellant when passing through the cooling device, so that the propellant enters the turbine at the highest possible temperature. This makes it possible to produce a correspondingly high compression of the propellants in the fuel pumps.

If the mainstream principle is not employed, it is also contemplated that a coolant can be used for cooling the combustion-chamber wall other than the first propellant, or a different kind of cooling device can be used. The present invention is therefore not limited to these particular engines.

FIG. 2(a) shows a cross-section of the structure of the above-described kind of combustion chamber 4, which has a narrowing 11, the so-called combustion-chamber neck. The inner layer 12 of the combustion-chamber wall contains cooling channels 14 (FIGS. 2 b)–d)) through which a coolant passes, in the case described above, the first propellant. The cooling channels 14 are covered by a second layer 13 of the combustion-chamber wall on the side facing away from the hot-gas side of the combustion-chamber wall. The coolant flows the cooling channels through a connecting channel 15 that can be connected to the fuel line 3 mentioned above and shown in FIG. 1, and the coolant then moves against (opposite) the flow direction 17 of the hot gas stream that is passing through the cooling channels 14 in the direction of the fuel injection head 9 (not depicted in FIG. 2 a)). Along the way, the coolant absorbs heat from the inner layer 12 of the combustion chamber.

In order to ensure that as much heat as possible is absorbed by the coolant, the embodiment under discussion provides diagonal grooves 16 in the inner wall layer 12 of the combustion chamber. These grooves 16 essentially run in the circumference direction of the combustion chamber, thus essentially extending across the flow direction 17. The grooves 16 can take the form of closed circular grooves, which can be engraved or otherwise formed individually, for example. This forming step can be the last step in the production of the combustion chamber. However, the grooves can also be slanted against the circumference direction, for example, in the form of threading slanted at a maximum of 45° relative to the circumference direction. The threading can also have single or multiple spirals.

FIG. 3 depicts an example of the dimensions of the inner wall layer 12 of the combustion-chamber wall and depressions 16, particularly depressions in the form of diagonal grooves. The inner wall layer 12 of the combustion-chamber wall has a thickness ($d_w$) ranging from a few tenths of a millimeter to several millimeters, for example, 0.5–1 mm, over a cooling channel 14. The typical thickness of a thermally insulating outer layer would be less than 1 mm. It is, therefore sufficient to have depressions with a depth ($d_w$) in the area of a few tenths of a millimeter, for example a depth of 0.1–0.2 millimeters, in order to achieve flow destabilization of the outer wall layer.

FIG. 4 is a detailed showing of the dimensions of the slanted grooves, which have a depth ($d_w$), width (w), radius (r) and gap (a) between grooves. The depth of the diagonal grooves ($d_w$) is also in the area of a few tenths of a millimeter, for example a range of 0.1–0.2 mm. Because of the notching effect, the radius (r) of the grooves should be a large as possible, in the present instance, for example, about 1.5–2 times the depth ($d_w$) of the grooves. A groove-width (w), which in the case of FIG. 4 is about 2–3 times the depth ($d_w$) of the grooves, produces grooves that largely take the form of circular segments, except for effects on groove form that are dependent on the production process.

The distance between the grooves can be adjusted to local requirements for the strength of heat transfer to the combustion-chamber wall, i.e., the local density of the number of depressions can be adjusted using the gaps between them. In the embodiment of FIG. 4, the distance is about 1 mm, which is about ten times the groove depth ($d_w$), so that here, 10 grooves per centimeter of length are intended. However this density can be increased or decreased as required, and range from completely smooth areas, that is with a density of 0 grooves per centimeter, for example, up to 50 grooves per centimeter. As stated in the beginning, it can be an advantage to have higher localized groove density in an area near the fuel injection head or in an area downstream from the combustion chamber neck, or to have depressions only in these areas (in this case grooves) but to have the inner wall of the combustion chamber smooth everywhere else.

The present embodiments refer to depressions in the form of grooves. Other kinds of depressions that roughen the inner surface of the combustion chamber can, however, also be used within the scope of the present invention. They can also be adjusted to the above-depicted scale of dimensions for these depressions. Examples of these options could include roughening a surface by using blast media or water-jet technology.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A combustion chamber for a rocket engine that expels a hot stream of gas, comprising a cooling device, and an inner combustion-chamber wall adjoining the cooling device, wherein the inner combustion-chamber wall includes depressions configured to result in flow destabilization of a stable outer layer of the hot stream of gas that forms in proximity to the inner combustion-chamber wall during combustion chamber operation, and wherein the depressions are configured as grooves slanted at a maximum angle of 45° relative to a circumferential direction of the combustion chamber.

2. The combustion chamber according to claim 1, wherein the depressions have a depth no more than half of the thickness of the inner combustion-chamber wall.

3. The combustion chamber according to claim 1, wherein the depressions have a depth not exceeding the thickness of the outer layer.

4. The combustion chamber according to claim 1, wherein the depressions are closed grooves.

5. The combustion chamber according to claim 1, wherein the depressions are threading with at least one spiral.

6. The combustion chamber according to claim 1, wherein a cross-section of the depressions are configured as a circular segment in which the radius of the circular segment is at least equal to the depth of the depression.

7. A combustion chamber for a rocket engine that expels a hot stream of gas, comprising a cooling device, and an inner combustion-chamber wall adjoining the cooling device, wherein the inner combustion-chamber wall includes depressions configured to result in flow destabilization of a stable outer layer of the hot stream of gas that forms in proximity to the inner combustion-chamber wall during combustion chamber operation, wherein an area of the inner combustion chamber wall has depressions of varying densities.

8. The combustion chamber according to claim 7, wherein the combustion chamber has a fuel injection head on one end thereof and a combustion-chamber neck on an opposite end thereof, the latter constituting an exhaust opening for the stream of gas, and at least one of an area near the fuel injection head and an area downstream from the combustion-chamber neck has a greater density of the depressions.

* * * * *